United States Patent [19]
Mostoller et al.

[11] Patent Number: 6,146,263
[45] Date of Patent: Nov. 14, 2000

[54] APPARATUS AND METHOD FOR CLEANING POULTRY

[75] Inventors: Charles R. Mostoller, Langhorne, Pa.; Fritz Norbury, Carthage, Mo.

[73] Assignee: Rhodia Inc., Cranbury, N.J.

[21] Appl. No.: 08/749,227

[22] Filed: Nov. 14, 1996

[51] Int. Cl.[7] .................................................. A22C 21/04
[52] U.S. Cl. .......................................... 452/173; 452/77
[58] Field of Search .............................. 452/173, 77, 123

[56] References Cited

U.S. PATENT DOCUMENTS

| | | | |
|---|---|---|---|
| Re. 34,149 | 12/1992 | Markert | 452/173 |
| 4,876,767 | 10/1989 | Harben et al. | 452/123 |
| 5,041,054 | 8/1991 | van den Nieuwelaar et al. | 452/173 |
| 5,482,503 | 1/1996 | Scott et al. | 452/173 |

OTHER PUBLICATIONS

Lindholst & Co., Technical Specification on No. 13–496, two pages, Nov. 1992.
Meyn, Technical Specification for Turkey & Duck Processing, two pages, prior to Aug. 23, 1996.
Johnson Food Equipment, Technical Specification for I/O Birdwasher V–T, two pages, prior to Aug. 23, 1996.
Johnson Food Equipment, Technical Specification for I/O Turkey Birdwasher, one page, prior to Aug. 23, 1996.
Stork Gamco, Inc., Technical Specification for MBW–16, two pages, prior to Aug. 23, 1996.
Stork Gamco, Inc., Technical Specification for C38t, two pages, prior to Aug. 23, 1996.
Meyn, Technical Specification for Inside/Outside Birdwashere, two pages, prior to Aug. 23, 1996.
Spraying System Co., Industrial Spray Products, Catalog 55, eight pages; 1994.

*Primary Examiner*—Willis Little
*Attorney, Agent, or Firm*—Andrew M. Solomon

[57] ABSTRACT

An apparatus is provided for cleaning poultry carcasses having a cavity. A plurality of cleaning heads are spaced about a sprayer carousel that is rotatably mounted upon a vertical shaft. The cleaning heads are mounted upon a plurality of vertically oriented guide rails which are spaced about the sprayer carousel. A circumferential cam is fixedly connected to the vertical shaft inside the sprayer carousel. A cam follower connected to each cleaning head follows the profile of the cam, displacing the cleaning head vertically along the guide rails. A conveyor transports the carcasses sequentially into and out of engagement with the sprayer carousel and an indexing member maintains each of the carcasses in alignment with one of the cleaning heads. In response to relative movement between the fixed cam and the rotatable sprayer carousel the cam follower of each cleaning head follows the circumferential profile of the cam. In this way each cleaning head is inserted into the internal cavity of the carcass where the probe is maintained for a dwell period before being withdrawn from the internal cavity.

20 Claims, 7 Drawing Sheets

APPARATUS AND METHOD FOR CLEANING POULTRY

FIELD OF THE INVENTION

The present invention relates to a poultry cleaning device for cleaning the residual viscera on a poultry carcass once the carcass has been eviscerated. In particular, the device of the present invention provides an improved poultry cleaning device incorporating a plurality of cleaning heads, each of which extend into a cavity in an eviscerated bird. The cleaning heads are maintained at an extended position during a lower dwell period, so that cleaning fluid sprayed into a cavity of a bird drains from the bird while the cleaning head is extended into the cavity of the bird. In addition, the present invention provides an improved nozzle operable in connection with each cleaning head.

BACKGROUND OF THE INVENTION

The use of cleaning devices that clean eviscerated birds by inserting a cleaning head into an internal cavity of the bird are well-known in the art. One difficulty with the known cleaning devices is that for certain types of poultry, the cleaning fluid is unable to freely drain from the internal cavities of the birds. In particular, poultry such as turkeys have an upper cavity and a lower cavity. In the known devices, the cleaning fluid sprayed into the upper cavity of a turkey often does not properly drain so that cleaning fluid is trapped in the upper cavity of the turkey.

Another difficulty frequently encountered relates to the need for thoroughly cleaning the internal cavities of poultry. This difficulty occurs because many of the known cleaning heads incorporate a nozzle having discharge orifices that direct the flow of cleaning fluid directly toward the internal cavity of a bird. Typically, such nozzles have a plurality of small discharge orifices that direct a plurality of thin streams of cleaning fluid toward the internal cavity. Often the area of the internal cavity between adjacent streams of cleaning fluid is not properly cleaned. Other nozzles incorporate a unidirectional flow that is unable to thoroughly clean certain areas of different types of poultry.

SUMMARY OF THE INVENTION

In accordance with the present invention, an apparatus is provided for cleaning poultry. More specifically, the apparatus functions to spray cleaning fluid into a cavity of an eviscerated poultry carcass to remove any residual viscera.

To clean a poultry carcass having a cavity, the apparatus includes a cleaning head operable between a retracted position and an extended position. The cleaning head includes a spray tip for spraying cleaning fluid into the internal cavity of the carcass. A circumferencial cam controls the displacement of the cleaning head from the extracted position to the extended position. The cam includes an upper dwell portion and a lower dwell portion, which extends for at least approximately 30° of the circumference of the cam. A cam follower connected to the cleaning head engages the cam, tracing the profile of the cam. In this way the cleaning head is displaced from the retracted position to the extended position so that the cleaning head extends into the internal cavity of the carcass.

The present invention also provides for an improved nozzle operable in connection with the cleaning apparatus. The nozzle includes a fluid inlet for receiving cleaning fluid, which is in fluid registry with a plenum. A plurality of discharge orifices are circumferentially spaced about the plenum and two external circumferential diffusion surfaces oppose the discharge orifices. Each of the discharge orifices direct a stream of cleaning fluid onto one of the diffusion surfaces so that the stream of cleaning fluid is diffused by the diffusion surface and directed radially outwardly from the nozzle.

DETAILED DESCRIPTION OF THE DRAWINGS

The foregoing summary, as well as the following detailed description of the preferred embodiments of the present invention, will be better understood when read in conjunction with the appended drawings, in which.

DESCRIPTION OF THE PREFERRED EMBODIMENTS

Figure 1:
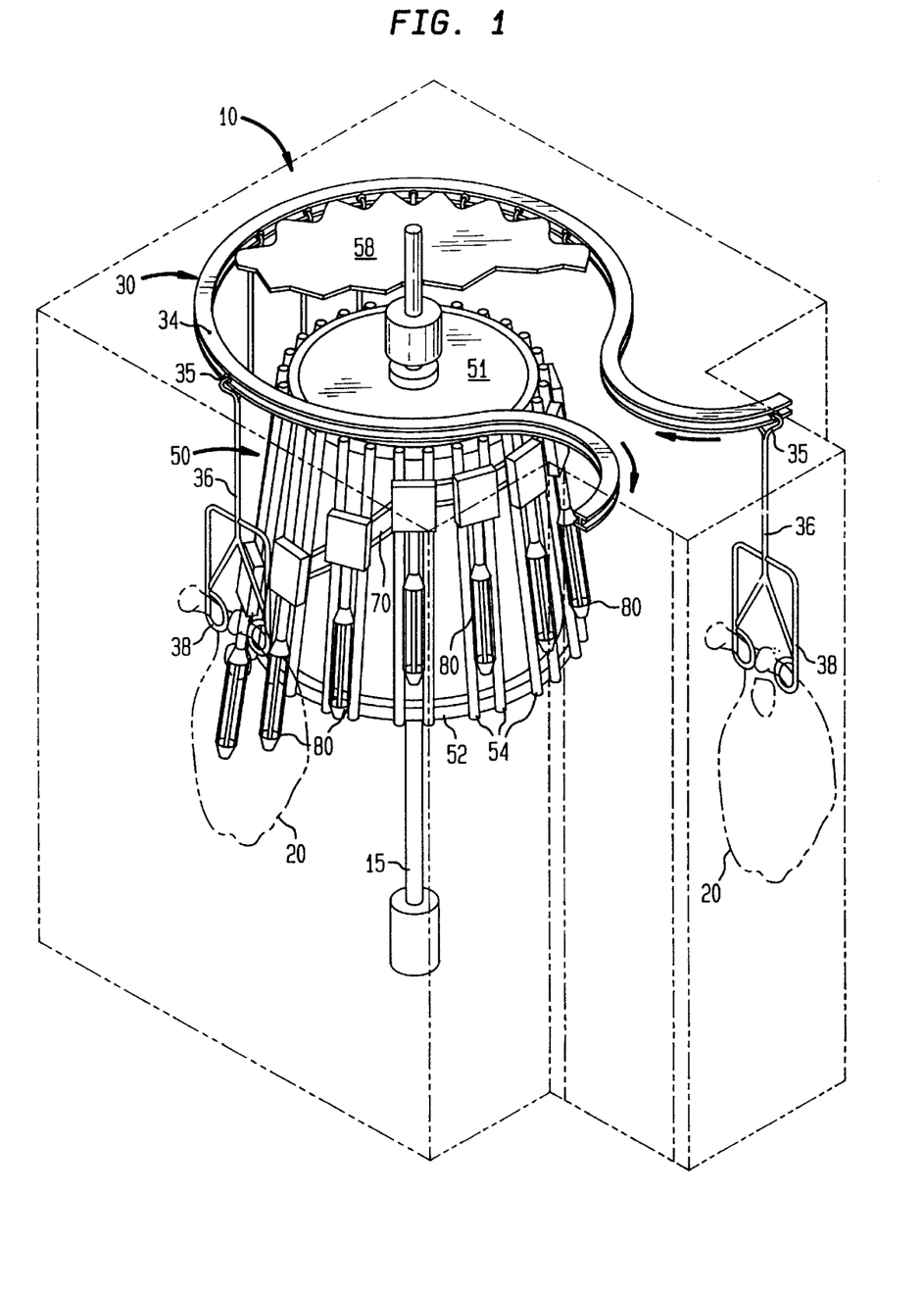
FIG. 1 is a fragmentary perspective view of a poultry cleaner in accordance with the present invention.
Figure 2:
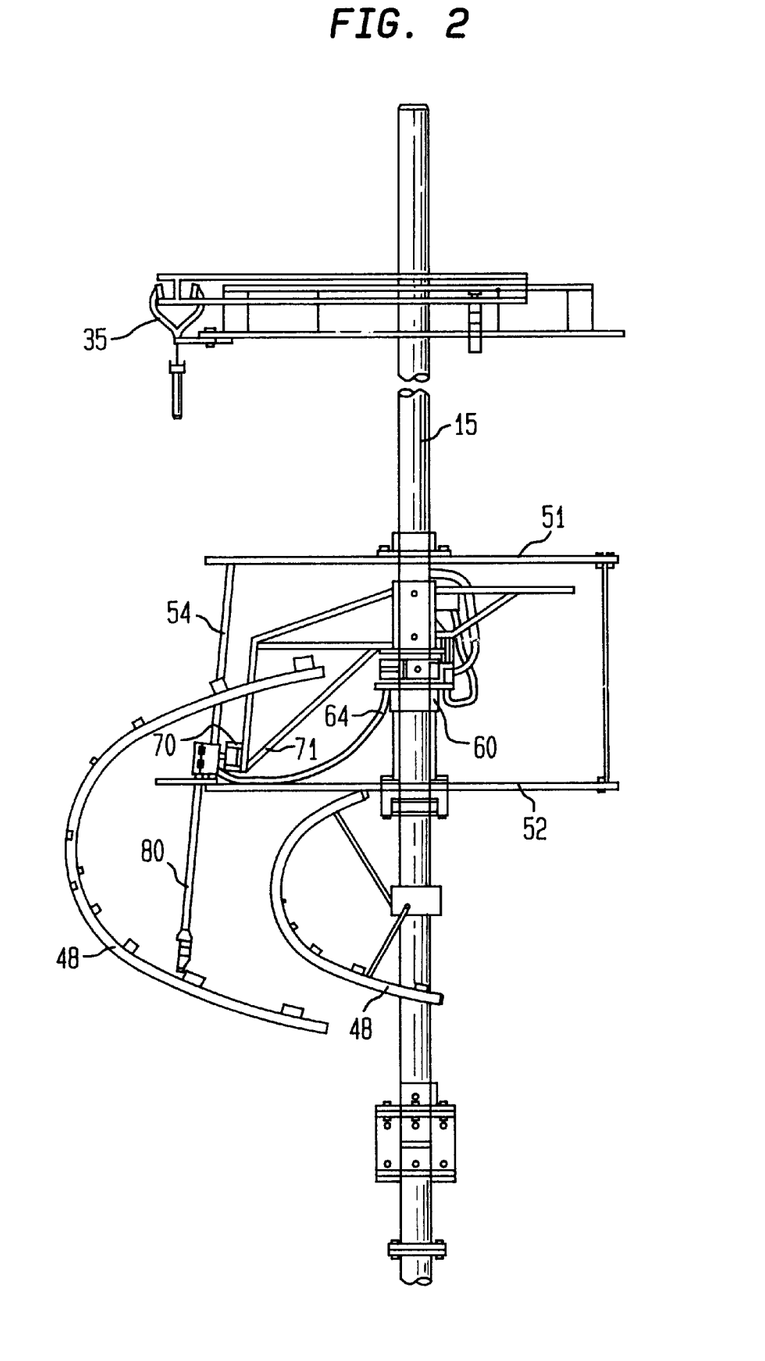
FIG. 2 is a fragmentary side elevational view of the poultry cleaner illustrated in FIG. 1.
Figure 3:
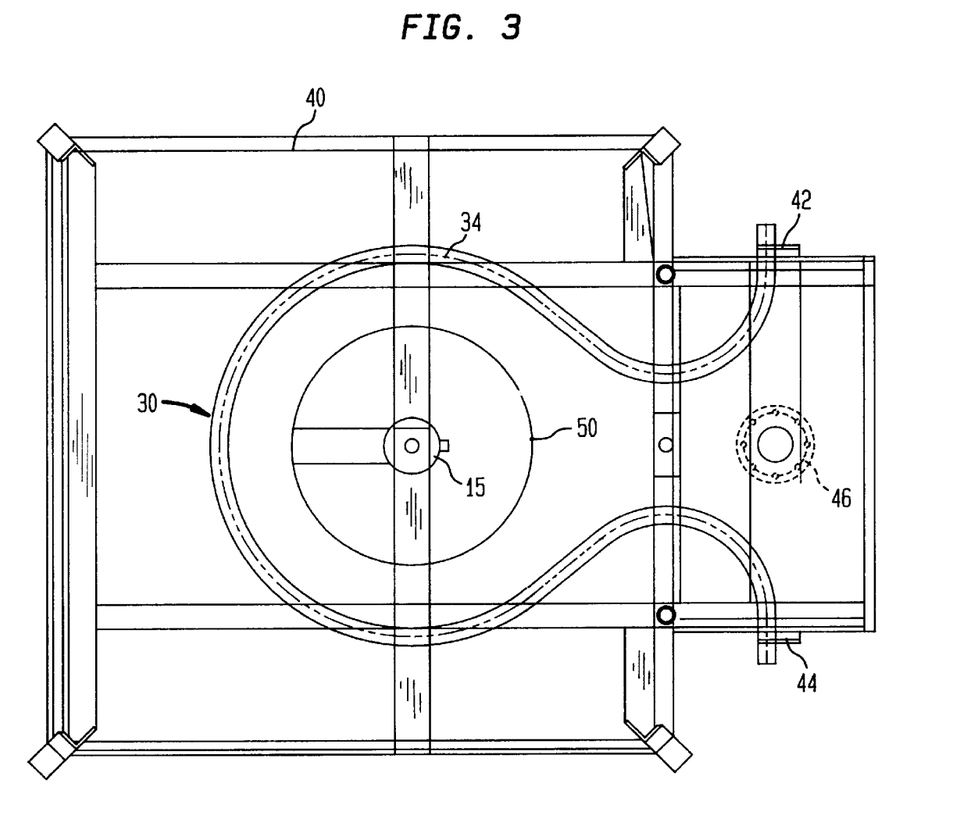
FIG. 3 is a schematic plan view of the poultry cleaner illustrated in FIG. 1.

Referring now to the drawings in general and to FIGS. 1 and 2 specifically, a poultry cleaner 10 is illustrated. Preferably, the poultry cleaner 10 is a station that is incorporated into an automated poultry processing system. To this end, birds that have been eviscerated are conveyed to the poultry cleaner to remove residual viscera by spraying the external surface and the internal cavities of the birds with a cleaning fluid. The cleaned birds are then conveyed to the next station along the processing line for further processing.

In the cleaner 10, the eviscerated birds engage a rotatable spray carousel 50 having a plurality of spray heads 80 spaced about the circumference of the carousel. As a bird 20 engages the spray carousel 50, the bird is aligned with a spray head 80 so that the spray head can be inserted into the cavity of the bird. The conveyor 30 and the carousel 50 are interconnected so that as the bird engages the carousel and aligns with the spray head, the bird rotates about the carousel for approximately 270° at the same speed as the carousel, thereby maintaining the bird in alignment with the spray head as the bird passes through the cleaner 10.

As a bird 20 travels around the carousel 50, the bird is sprayed internally and externally to remove any residual viscera remaining on the bird after evisceration. The external spray is provided by a plurality of sprayers disposed about the carousel 50. In the present instance the external sprayers are helical sprayers 48 disposed inside and outside the circumference of the carousel 50. (For clarity, the helical sprayers are not illustrated in FIG. 1.) As shown in FIG. 2, a series of nozzles on the helical sprayers 48 is provided for spraying the external surface of the bird as the bird travels around the carousel.

Each bird 20 is cleaned internally by one of the spray heads 80. As the bird 20 travels around the carousel 50, the spray head 80 travels into the bird, spraying cleaning fluid into the internal cavities of the bird. The spray head 80 travels vertically along a pair of guide rails 54 that are spaced about the circumference of the carousel 50. The travel of the spray head along the guide rails 54 is controlled by a circumferential cam 70 fixed in a position disposed radially inwardly from the carousel. A cam follower 120 connected to the spray head 80 engages the cam 70. As the carousel 50 rotates, the cam follower 120 follows the profile of the fixed cam 70 thereby displacing the spray head 80 in response to the profile of the cam 70.

Figure 5:
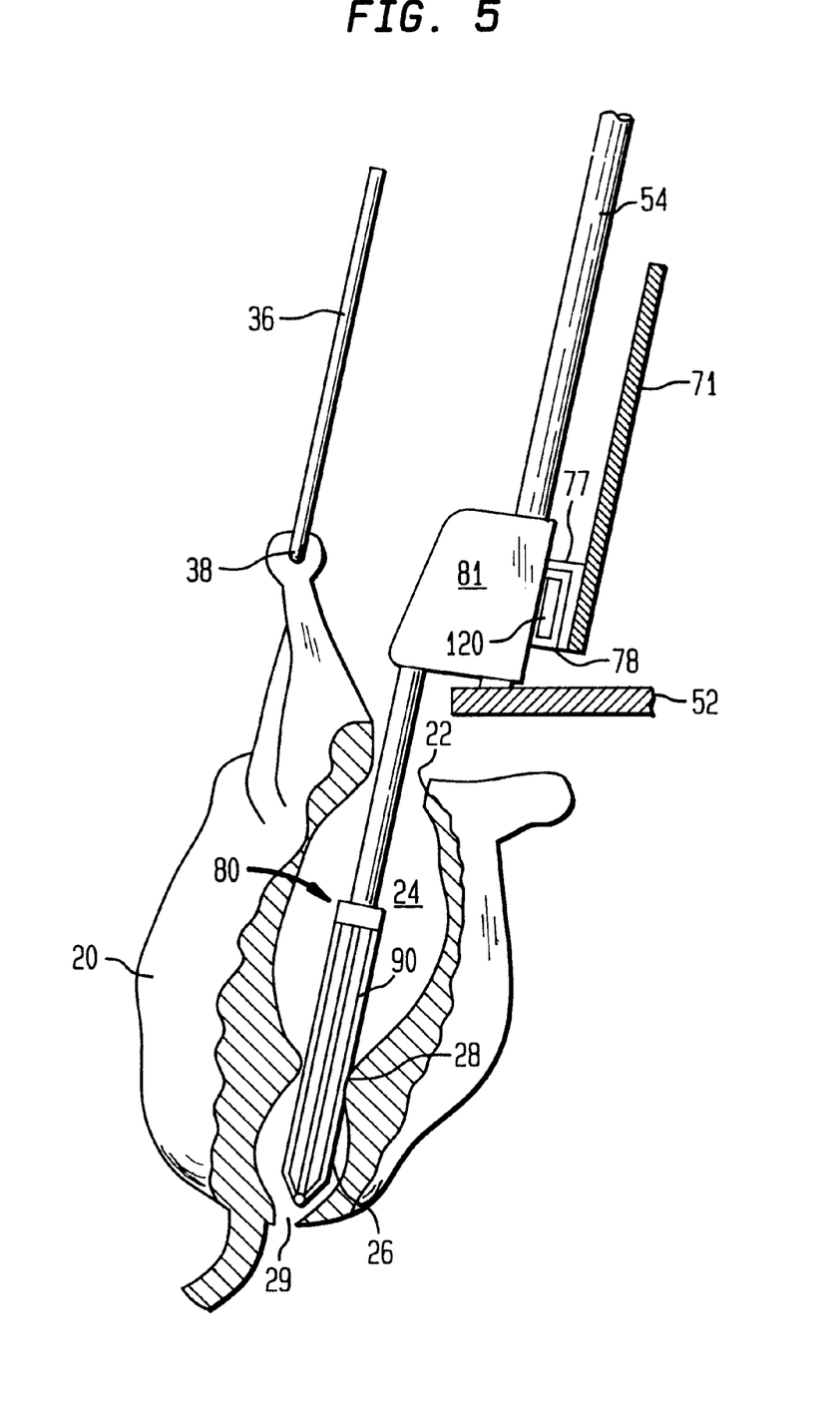
FIG. 5 is an enlarged fragmentary side elevational view partly in section of a spray head used in connection with the poultry cleaner shown in FIG. 1, with the spray shown extended into a bird.

As shown in FIG. 5, birds such as turkeys have two cavities, an upper cavity 24 and a lower cavity 26. A piece of tissue, referred to as a diaphragm 28, separates the upper cavity from the lower cavity. As the spray head enters the lower cavity, the spray head expands the diaphragm 28. The cleaning fluid sprayed into the lower cavity 26 drains out a drainage opening 29 adjacent the neck. Frequently, the diaphragm 28 contracts after the spray head 80 is removed from the lower cavity 26, preventing cleaning fluid in the upper cavity from draining into the lower cavity and out the drainage opening. To allow the upper cavity 24 to properly drain, the spray head 80 remains extended in the lower cavity for a period. While extended in the lower cavity, the spray head maintains the diaphragm in an expanded state allowing the cleaning fluid to drain around the spray head and out of the upper cavity 24. After remaining extended in the lower cavity for a period, the spray head retracts out of the bird before the bird exits the cleaner 10.

To begin the cleaning process, eviscerated birds 20 are transported along a conveyor 30 to the cleaner 10, typically at the rate of 30–50 birds per minute. The conveyor 30 is an overhead track 34 that extends between each station along the processing system. Each bird is hung from a yoke 35 that rides along the track 34. An elongated rod, referred to as a shackle bar 36, is universally connected to the yoke 35. A shackle 38 connected to the distal end of the shackle bar 36 grips the bird about the knuckle of each thigh. A drive chain (not shown) connected to each yoke 35 drives the birds along the overhead track 34. Typically, the yokes are spaced apart approximately 12" from one another along the chain so that the birds are spaced from each other along the conveyor 30. As shown in FIGS. 1 and 5, the birds are hung from the track 34 so that the vent 22 of each bird is oriented upwardly to allow a spray head 80 to be inserted through the vent 22 into the cavities in the bird during the cleaning operation.

The conveyor 30 serially transports the birds to the cleaner 10 which cleans the birds by spraying the inside and outside of each bird with a cleaning fluid such as water or a trisodium phosphate solution. A housing 40 encloses the cleaner 10 to contain the cleaning fluid, which flows into a drain 46 in the floor of the housing 40 after being sprayed on the birds. The fluid flowing into the drain is then collected and recirculated through the cleaner 10. An entrance 42 and an exit 44 in the housing 40 allow the birds transported by the conveyor 30 to enter and exit the housing.

The conveyor 30 transports each bird through the entrance 42 into the cleaner 10. The birds are then transported around a spray carousel 50 rotating about a shaft 15. An indexing plate 58 connected to the spray carousel 50 circumferentially spaces the birds around the spray carousel. As illustrated in FIG. 1, the indexing plate 58 is a circular plate having a series of circumferentially spaced indexing teeth that engage the shackle bar 36 for each bird. In this way, the indexing plate 58 maintains each bird 20 at a fixed circumferential position relative to the spray carousel 50 as the birds are transported through the cleaner.

The rotation of the spray carousel is controlled by the chain that drives the conveyor 30. A drive cog (not shown) connected to the spray carousel 50 engages the chain in the conveyor 30. As shown in FIG. 1, the conveyor track 34 is curved to generally follow the circumference of the spray carousel 50. As the chain in the conveyor drives the birds around the curved track 34, the chain also drives the drive cog connected to the spray carousel, thereby matching the rotational speed of the spray carousel with the speed at which the birds are conveyed around the carousel.

The spray carousel 50 is a frustoconical drum rotatably mounted on the vertical shaft 15. The carousel has a circular upper plate 51 and a larger circular lower plate rotatably mounted to the shaft 15. A plurality of guide rods 54 are circumferentially spaced about the upper and lower plates, connecting the plates to form the frustoconical drum shape. The guide rails 54 are connected to the plates 51 and 52 in parallel spaced pairs, such that the guide rails in a pair are parallel, but adjacent pairs are not necessarily parallel.

A plurality of spray heads 80 are mounted on the guide rails 54 of the spray carousel 50. Each spray head 80 is mounted on one of the pairs of guide bars 54 so that the vertical displacement of the spray head is guided by the pair of guide bars. The spray heads 80 move up and down along the guide bars in response to a circumferential cam 70. A cam follower 120 connected to each spray head 80 traces the profile of the cam 70 as the carousel 50 rotates about the cam, thereby displacing the spray heads vertically along the guide bars 54 as discussed below.

As best seen in FIG. 1, the cam 70 is a linear-type cam wrapped around the interior of the spray carousel 50 and is spaced inwardly from the guide bars 54. As illustrated in FIGS. 2 and 5, the cam 70 is supported by a framework of braces 71 fixedly connected to the shaft 70. Because the cam 70 is fixed to the shaft, the rotation of the spray carousel 50 about the fixed shaft 15 causes relative motion between the carousel and the cam.

The cross-section of the cam 70 is seen most clearly in FIG. 5. The cam 70 is a U-shaped channel having upper and lower drive surfaces 77 and 78, respectively. The cam follower 120 connected to each spray head 80 follows the upper and lower drive surfaces, thereby displacing the spray heads to follow the profile of the cam.

Figure 4:
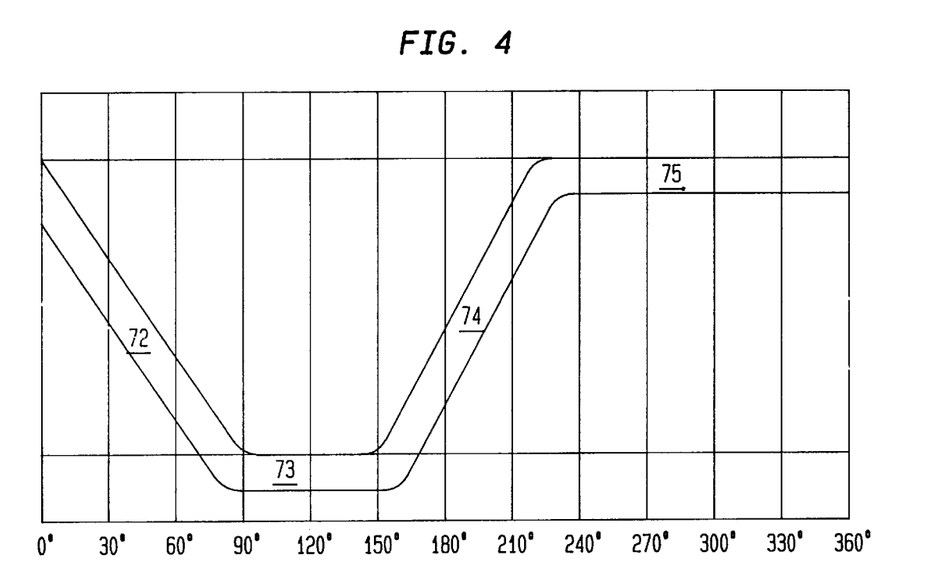
FIG. 4 is a schematic representation of the profile of a cam used in connection with the poultry cleaner shown in FIG. 1.

The profile of the cam is illustrated in FIG. 4, which represents the profile of the cam if the cam is unwrapped and laid out from end to end. As shown, the cam includes two dwell portions, an upper dwell 73 and a lower dwell 75, and two translational portions, an insertion portion 72 and an extraction portion 74. The angular designations in FIG. 4 represent angular points around the circumference of the cam when the cam is wrapped around the interior of the carousel. For instance, the zero degree mark at the left end of the cam profile represents the point at which a bird engages the spray carousel 50. At this point, the cam 70 is at its highest vertical point corresponding to a fully retracted spray head position. The portion of the cam from zero degrees to approximately 90° is the translational portion 72 corresponding to the insertion of the spray head into the bird. From approximately 90° to approximately 150° is the lower dwell portion 73 which corresponds to the dwell period that the spray head 80 remains fully inserted in the bird to allow the bird to drain. From approximately 150° to approximately 220° is the translational portion 74 corresponding to the extraction of the spray head 80 from within the bird. From approximately 220° to 360° is the upper dwell portion 75, which corresponds to the dwell period during which the spray head 80 is fully retracted from the bird and the bird is conveyed away to exit the cleaner.

Referring to FIG. 2, a manifold 60 provides cleaning fluid to the spray heads 80 via a plurality of fluid lines 64. The manifold includes a rotary valve to control the flow of the fluid to the fluid lines 64. In the present instance, the rotary valve includes a fixed body and a rotatable body that rotates along with the spray carousel 50. Both the fixed body and the rotatable body have ports. When the ports on the rotatable body align with the ports in the fixed body, cleaning fluid flows from the manifold to the corresponding spray head.

In the present instance, the rotary valve is configured so that cleaning fluid flows to each spray head 50 as follows. At zero degrees along the cam 70 a bird 20 is aligned with a spray head 50, and cleaning fluid does not flow to the spray head 50. The spray head 50 travels vertically toward the bird 20, and prior to entering the bird, the ports in the fixed and rotatable portions of the rotary valve align so that fluid flows from the manifold 60 to the sprayhead 50 via one of the fluid lines 64. Preferably, the start of the cleaning fluid is timed so that the cleaning fluid starts flowing just prior to the entrance of the spray head 50 into the average size bird being processed by the cleaner 10. In this way the amount of cleaning fluid sprayed before the spray head enters the bird 20 is diminished, thereby minimizing wasted cleaning fluid. Once the flow of cleaning fluid starts, the flow continues until the spray head is fully extended. Once the spray head 50 is fully extended, the rotary valve stops the flow of cleaning fluid to the spray head. The cleaning fluid then drains from the bird during a dwell portion as is further described below. Although in the present instance the flow of fluid stops once the spray head is fully extended, the flow of fluid may be stopped before the spray head is fully extended.

As noted, the circumferential point along the cam 70 at which a bird engages the cleaner and is oriented under a spray head is designated as zero degrees in FIG. 4. When the bird engages the carousel, the spray head 80 is in the fully retracted position above the bird. As the bird and carousel rotate around the cam 70 for the first 90°, the cam follower 120 traces the downward path of the cam, thereby displacing the spray head downward, inserting the spray head into the bird. The insertion portion 72 of the cam 70 can be circumferentially shorter or longer depending on the desired amount of spray time and the desired amount of dwell time. For example, if the insertion period is shortened to 60° instead of 90°, the reduction of 30° from the insertion portion can be added to the lower dwell portion 73 increasing the lower dwell portion to 90°, thereby increasing the amount of time that cleaning fluid can drain from the bird. However, the spray head 80 only sprays fluid inside the bird during the insertion period. Therefore, reducing the insertion portion reduces the amount of time the spray head is spraying cleaning fluid. In addition, decreasing the insertion period sharpens the downward angle of the cam 70 thereby increasing the reactional force applied to the cam and the cam follower 120. When the cam follower 120 contacts either of the angled translation portions of the cam, the reactional force has a vertical or longitudinal component and a horizontal or transverse component. The vertical component against the cam follower 120 causes the spray head to move vertically along the guide rails 54. The transverse component, however, operates against the force of the conveyor transporting the bird around with the carousel. Therefore, the cam follower 120 must be sufficiently strong to withhold the transverse force component. In the present instance, it has been found that a desirable compromise among these competing factors is an insertion portion of about 90° in circumferential length.

As the spray head 80 is inserted downward into the bird, the spray head cleans the inside cavity of the bird with a cleaning fluid. Birds such as turkeys 20 have two cavities separated by a diaphragm 28 that frequently expands to seal the passage between the two cavities. As illustrated in FIG. 5, when cleaning such birds, the spray head extends through the upper cavity 24 into the lower cavity 26 to clean the lower cavity.

While the spray head is extended into the lower cavity 26, the spray head displaces the diaphragm 28 allowing the cleaning fluid in the upper chamber 24 to drain into the lower cavity. From the lower cavity, the cleaning fluid freely drains out of a drainage opening 29 adjacent the neck of the bird.

After a bird 20 has rotated around the insertion portion of the cam 70, the spray head 80 is in its lowermost position extending into the lower cavity 26 of the bird, and depending on the size of the bird, the spray head may extend out through the drainage opening 29. While the spray head 50 is extended into or through the lower cavity, the supply of cleaning fluid to the spray head is shut off and the cleaning fluid is allowed to drain from the bird during a dwell period. During the dwell period, the spray head 80 is maintained in a fully extended position. While the spray head is fully extended during the dwell period, the spray head displaces the diaphragm 28 between the upper and lower cavities of the bird, allowing the cleaning fluid sprayed in the upper chamber to drain into the lower cavity and out of the bird. In this way, the amount of cleaning fluid trapped in the upper cavity is significantly reduced.

If the lower dwell period is significantly below 30° in circumferential length then the drainage time for the birds may not be adequate. In addition, a longer lower dwell time is advantageous so that a lower dwell time of greater then 40° in circumferential length is preferred over 30°. In the present instance, the carousel has sixteen spray heads and the lower dwell is approximately 60° in circumferential length. If the diameter of the carousel is increased to provide for more sprayheads, a lower dwell of approximately 50° in circumferential length may be utilized to provide a time period similar to the 60° dwell period on a sixteen spray head device. Further, the lower dwell may be increased to over 60° in circumferential length. However, increasing the lower dwell to over approximately 90° may adversely affect the operation of the apparatus during the remaining portions of the cam profile.

After the spray carousel has rotated past the lower dwell portion 73 of the cam 70, the cam follower engages the upwardly angled retraction portion 74 of the cam. As the carousel is rotated around the retraction portion of the cam, the spray head 80 is displaced upwardly along the guide rails, retracting the spray head out of the bird. The optimal circumferential length of the retraction portion 74 of the cam is based on several factors including the desired lower dwell period and the strength of the cam and the cam follower. In the same way that decreasing the length of the insertion portion of the cam can increase the lower dwell time, as discussed previously, decreasing the length of the retraction portion can also increase the length of the lower dwell portion, thereby allowing more drainage time. However, decreasing the length of the retraction portion increases the reactional forces that the cam 70 and cam follower must withstand in the same way that the reactional forces are increased when the insertion portion of the cam is reduced, as discussed above. Therefore, it has been found that a retraction portion of approximately 70° in circumferential length is desirable. However, as with the insertion portion, the length of the retraction portion may be altered based on the conveyor speed and the strength of the cam and cam follower.

After the spray head 80 is fully retracted from the bird, the bird continues to follow the carousel around the cam, following the upper dwell portion 75 of the cam, maintaining the spray head in a fully retracted position. Along the upper dwell portion, the conveyor track 34 curves away from the spray carousel 50, so that the shackle bar 36 of the bird disengages from the indexing plate 58 and the bird is transported away from the spray carousel and out the exit opening 44.

In total, each bird engages with the spray carousel and rotates with the spray carousel preferably for at least 220°: equal to the preferred lengths of the insertion portion (90°) the lower dwell (60°) and the retraction portion (70°) of the cam 70. In the present instance each bird engages the spray carousel and rotates with the spray carousel for approximately 270°. The additional length of rotation is provided so that the birds can engage the upper dwell of the cam when the birds first engage the carousel, rather than engaging the carousel at the beginning of the insertion portion of the cam as shown in FIG. 4. The additional length also allows the birds to engage the upper dwell portion of the cam for a period after the spray heads are retracted from the birds before the birds disengage the carousel.

Figure 6:
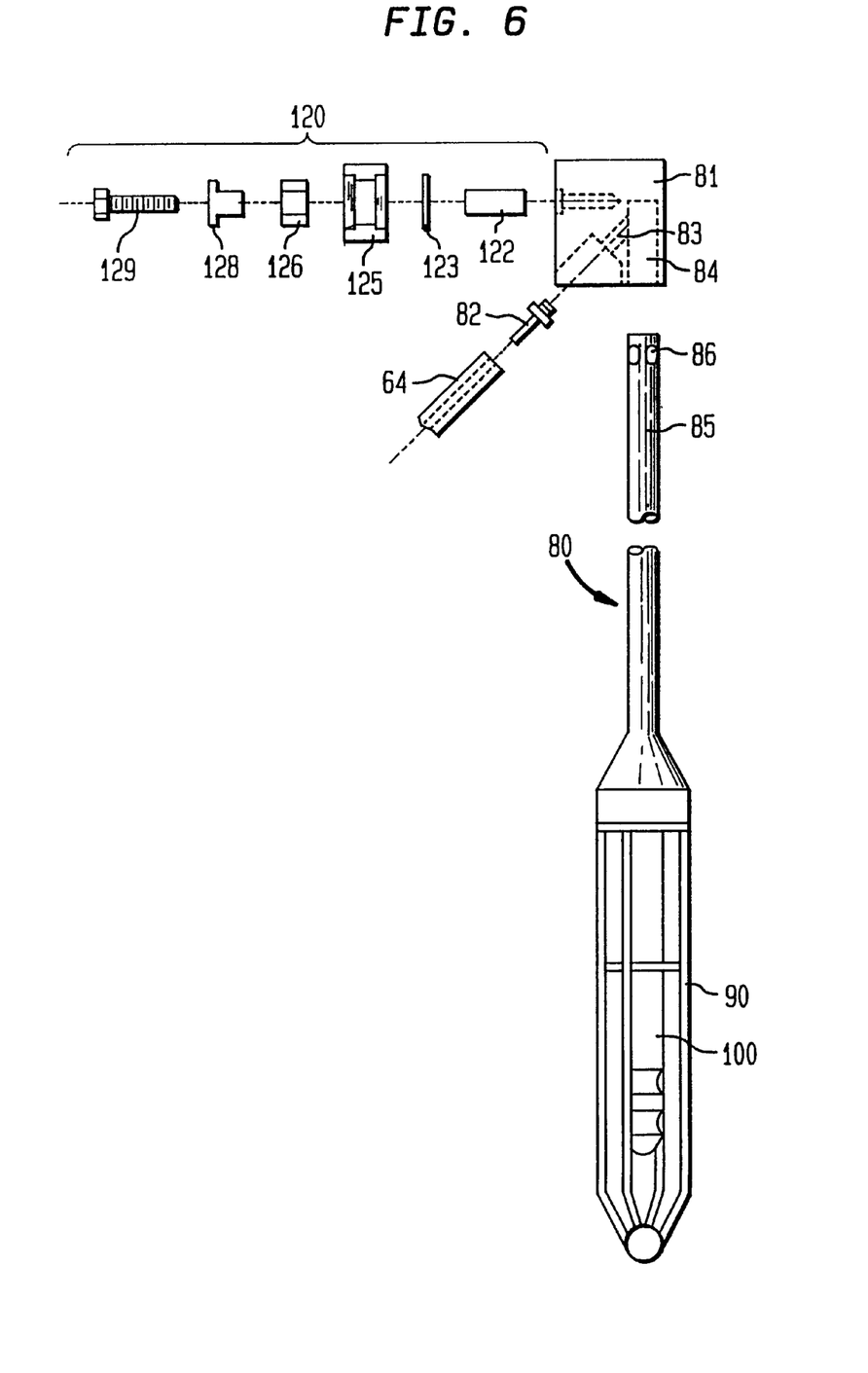
FIG. 6 is an enlarged exploded side elevational view partly in section of a spray head used in connection with the poultry cleaner shown in FIG. 1.
Figure 7:
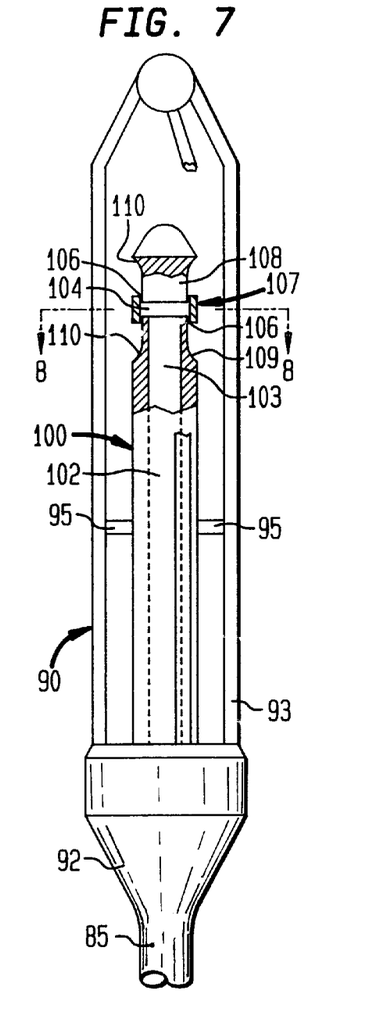
FIG. 7, is an enlarged fragmentary view partially in section of a spray tip used in connection with the poultry cleaner shown in FIG. 1.

Referring now to FIGS. 6 and 7, the details of one of the spray heads 80 are more clearly illustrated. As illustrated in FIG. 6, the spray head is connected to a guide block 81. The guide block is slidably attached to one of the parallel pairs of guide rails 54 disposed about the spray carousel 50, as shown in FIGS. 1 and 5. As shown more clearly in FIG. 1, each guide block 81 is disposed between two parallel guide rails 54, so that the guide block engages each rail. The guide block slides up and down the guide rails, being guided by the rails. In this way, the guide block vertically displaces the spray head connected to the guide block as the spray head rotates about the cam 70.

A cam follower is also connected to the guide block 81. In the present instance, the cam follower 120 is a roller type cam follower, including a roller 125 and a spacer 122 that maintains the roller 125 at a predetermined distance away from the guide block 81. The roller 125 engages the upper and lower drive surfaces 77 and 78 of the cam (see FIG. 5), rolling along the upper face 77 as the spray head 80 is being inserted into the bird and rolling along the lower surface 78 when the spray head is being retracted from the bird. A washer 123 disposed between the roller 125 and the spacer 122 reduces the wear of the spacer on the roller during operation. A bearing 126 is inserted into the interior bore of the roller and held captive in the roller by an insert 128. The cam follower is assembled and connected to the guide block 81 by a cap screw 129 extending through the cam follower, threadedly engaging the guide block.

A nipple 82, connected to the guide block 81, provides a means for connecting the guide block to one of the fluid lines 64. The nipple 82 is threaded into the guide block, registering with a fluid inlet 83. As shown in FIG. 2, the fluid line 64 is connected to the nipple 82 at the proximal end and to the manifold 60 at the distal end. The manifold 60 supplies cleaning fluid to each of the guide blocks and thereby to the spray heads via a plurality of fluid lines 64.

The fluid inlet 83 in the guide block extends into a socket 84 for receiving the spray head 80. The spray head has an elongated hollow cylindrical extension shaft 85 having a plurality of ports 86 circumferentially spaced about the proximal end. The shaft 85 is inserted into the socket in the guide block so that the ports 86 register with the fluid inlet 83, and then is fixedly connected to the guide block 81, for example by pinning the shaft 85 to the guide block.

A cage 90 surrounding a spray tip 100 is fixedly connected to the distal end of the extension shaft 85, preferably by welding. The spray tip includes an elongated hollow barrel 102 connected at the proximal end to a base 92 of the cage, and is in fluid registry with the extension shaft 85. The distal end of the barrel 102 is connected to a nozzle, which discharges the cleaning fluid onto the bird. A fluid passage 103 extends through the barrel 102 and into a plenum 104 located within the nozzle 107.

As shown in FIG. 7, the nozzle includes two external annular grooves forming a front trough 108 forward of the plenum 104 and a rear trough 109 rearward of the plenum, each of which preferably has a rounded bottom. In this way, the plenum 104 is located axially between the front and rear troughs, 108 and 109, and extends radially outward at least as far as the troughs. In other words, the diameter of the plenum 104 is equal to or greater than the external diameter of the nozzle 107 at the bottom of the front and rear troughs 108 and 109.

A plurality of discharge orifices 106 are circumferentially spaced about the plenum 104, extending from the plenum toward the front and rear troughs 108 and 109. In the present instance, the orifices 106 are parallel to the axis of the fluid passage 103 within the barrel 102. Preferably, the orifices are adjacent the external surface of the troughs 108, 109. In the present instance, the discharge orifices are parallel to the central axis of the fluid passage 103 and are tangent to the surface of the nozzle. In addition, the forward face of the front trough 108 and the rearward face of the rear groove trough 109 form concave diffusion surfaces 110 for diffusing the cleaning fluid discharged from the discharge orifices 106. The annular outer edge 112 of each diffusion surface 110 is a sharp edge to facilitate flow of the cleaning fluid radially away from the nozzle 107. If the outer edge 112 is rounded, some cleaning fluid will tend to flow around the outer edge 112 and continue flowing along the surface of the nozzle rather than being sprayed outwardly radially.

The nozzle 107 is illustrated in FIG. 7 as an integral single piece nozzle. However, if the nozzle if fabricated from metal, it is not practical to fabricate the nozzle from a single piece. Therefore, in the present instance, the nozzle 107 is fabricated from two pieces that are welded together. The first piece of the nozzle includes the rearward half of the plenum 104, with the orifices adjacent the rear trough 109. The second piece of the nozzle includes the forward half of the plenum 104, with the orifices adjacent the forward trough.

Referring to FIGS. 2 and 6, the fluid flows through the spray head 80 as follows. Fluid under pressure is received from the manifold 60 through the fluid line 64 connected to the nipple 82 on the guide block 81. The cleaning fluid flows through the fluid inlet 83 in the guide block 81 and through the ports 86 in the shaft 85 of the spray head 80. The fluid then flows through the shaft 85 to the spray tip 100.

Referring to FIG. 7, in the spray tip, the cleaning fluid passes through the fluid passage 103 extending through the barrel 102, and into the plenum 104 within the nozzle 107. From the plenum 104 the cleaning fluid is discharged from the discharge orifices 106 into the front and rear troughs 108 and 109. The fluid begins to diffuse as it flows along the surface of the troughs directed toward the diffusion surfaces. The fluid the flows over the diffusion surfaces and is further diffused as it is sprayed radially outwardly. In this way, the fluid discharged from the orifices 106 is diffused to create a generally continuous annular spray of cleaning fluid projecting forwardly and rearwardly, rather than a series of discrete circumferentially spaced streams of cleaning fluid.

As discussed previously, birds such as turkeys have an upper cavity 24 and a lower cavity 26 separated by a piece of tissue referred to as a diaphragm 29, as shown in FIG. 5. When the spray head passes into the lower cavity 26, the diaphragm may close around the spray tip 100 sealing the upper cavity 24 from the lower cavity, thereby trapping the cleaning fluid in the upper cavity. To prevent the diaphragm from sealing around the spray tip 100, a cage 90 surrounds the spray tip, preventing the spray tip from contacting the diaphragm.

Figure 8:
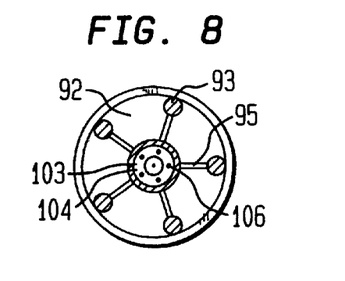
FIG. 8 is a cross-sectional view of the spray tip shown in FIG. 7 taken along line 8—8.

The cage 90 includes a base 92 that is fixedly connected to the distal end of the extension shaft 95 of the spray head 80, preferably by welding. The cage is made up of a plurality of narrow rods circumferentially spaced about the spray tip 100, radially spaced from the spray tip. The proximal end of the rods are fixedly connected to the base, preferably by welding, and the distal ends are bent inwardly so that all of the rods terminate at a central point forming a bulbous nose 94. A plurality of radial reinforcement braces 96 are spaced about the cage 90 connecting each rod 93 to the spray tip 100 as shown in FIG. 8.

During the cleaning process, the cage 90 operates as follows. As the spray head 80 is inserted into the lower cavity 26 of a bird, the nose 94 of the cage breaks the diaphragm between the upper and lower cavities if the diaphram was not previously broken during processing. However, because the nose is bulbous, it is unlikely that the nose will damage other tissue which the nose contacts in the cavities, or upon entering the cavities. When the spray tip 100 passes into the lower cavity, the cage contacts the diaphragm keeping the diaphragm from sealing the upper cavity. In this way, cleaning fluid can flow from the upper cavity 24 around the spray tip into the lower cavity 26 and out the drainage opening 29 in the lower cavity. In addition, the cage 90 prevents the diaphragm or any other part of the bird from contacting the spray tip, which decreases the possibility of a piece of tissue or viscera from temporarily blocking the orifices 106 in the nozzle.

It will be recognized by those skilled in the art that changes or modifications may be made without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. An apparatus for cleaning a plurality of poultry carcasses, comprising:
   (a) a vertical shaft;
   (b) a sprayer carousel rotatably mounted upon said shaft, comprising a plurality of vertically-oriented guide rails spaced about said sprayer carousel;
   (c) a circumferential cam fixedly connected to said shaft radially spaced from said guide rails, said cam having a circumferential profile including an upper dwell portion extending for at least approximately thirty degrees of the circumference of said cam, an angled insertion portion, a lower dwell portion, and an angled retraction portion;
   (d) a conveyor for transporting the carcasses sequentially into and out of engagement with said sprayer carousel;
   (e) a plurality of probes in said carousel, each of said probes engaging at least one of said guide rails, and being vertically displaceable along said one guide rail, each of said probes comprising:
      (i) a guide block engaging said one guide rail;
      (ii) an elongated conduit connected at one end to said guide block and extending parallel to said guide rail for registry with the internal cavity of a carcass;
      (iii) a nozzle connected to the distal end of said conduit;
      (iv) a cam follower engaging said cam;
   (f) an indexing member maintaining the first of the carcasses in alignment with a first of said probes;
   (g) a fluid supply providing fluid to said probes; and
   (h) a fluid controller for controlling the flow of cleaning fluid from said fluid supply to said probes so that there is an absence of spray while the cam follower engages the lower dwell portion of the cam;
   wherein in response to relative movement between said sprayer carousel and said cam, said follower of each probe follows the circumferential profile of said cam, thereby displacing each probe along said guide rails from an extracted position external of the carcass, to an inserted position within the internal cavity of the carcass, where the probe is maintained for a dwell period before being withdrawn to the extracted position.

2. The apparatus of claim 1 wherein said nozzle comprises a plurality of discharge orifices and an external circumferential diffusion surface opposing said orifices.

3. The apparatus of claim 1 wherein said cam is a linear type cam.

4. The apparatus of claim 3 wherein said cam comprises an upper drive surface and a lower drive surface and said follower engages the upper drive surface along the insertion portion of said cam and said follower engages the lower drive surface along the retraction portion of said cam.

5. The apparatus of claim 1 wherein said lower dwell portion extends for approximately 30 to 90 degrees of the circumference of said cam.

6. The apparatus of claim 5 wherein said lower dwell portion of said cam extends for approximately 60 degrees of the circumference of said cam.

7. The apparatus of claim 1 comprising a housing around said sprayer carousel for containing the cleaning fluid sprayed on the poultry carcass.

8. The apparatus of claim 1 comprising a plurality of external sprayers disposed circumferentially about said sprayer carousel for spraying cleaning fluid onto the external surface of the carcass as the carcass is conveyed around the sprayer carousel.

9. The apparatus of claim 1, wherein the fluid controller controls the flow of cleaning fluid so that there is an absence of spray while the cam follower engages substantially all of the lower dwell portion of the cam.

10. An apparatus for cleaning a poultry carcass having a cavity, comprising;
   (a) a cleaning head operable between a retracted position and an extended position, said cleaning head including a spray tip for spraying cleaning fluid;

(b) a circumferential cam for controlling the displacement of said cleaning head from the extracted position to the extended position, said cam including an upper dwell portion and a lower dwell portion extending for at least approximately thirty degrees of the circumference of said cam;

(c) a cam follower connected to said cleaning head, engaging said cam; and (d) a fluid controller for controlling the flow of cleaning fluid to said cleaning head so that there is an absence of spray while the cam follower engages the lower dwell portion of the cam;

wherein said cam follower traces the profile of said cam, thereby displacing said cleaning head from the retracted position to the extended position, so that said cleaning head extends into the internal cavity of the carcass.

11. The apparatus of claim 10 wherein the fluid controller controls the flow of cleaning fluid so that there is an absence of spray while the cam follower engages substantially all of the lower dwell portion of the cam.

12. The apparatus of claim 10 wherein said cleaning tip is maintained in a fixed vertical position in the cavity of the carcass as the cam follower traces the profile of the lower dwell portion of said cam.

13. The apparatus of claim 10 wherein said cam is a linear type cam.

14. The apparatus of claim 10 wherein said cam is a circumferential cam and said lower dwell portion extends for approximately 30 to 90 degrees of the circumference of said cam.

15. The apparatus of claim 14 wherein said dwell portion extends for approximately 60 degrees of the circumference of said cam.

16. The apparatus of claim 10 wherein said spray tip includes a nozzle comprising a fluid inlet, a plurality of discharge orifices in fluid registry with said fluid inlet, and two opposing external circumferential diffusion surfaces, such that cleaning fluid flowing into the fluid inlet is discharged through the discharge orifices and directed toward the diffusion surfaces, which diffuse the cleaning fluid to create two generally continuous opposing annular spray patterns directed radially away from said nozzle.

17. A method for cleaning a poultry carcass having an upper and a lower internal cavity, comprising the steps of:

(a) conveying a poultry carcass into engagement with a sprayer assembly having a cleaning head that includes two opposing external circumferential diffusion surfaces;

(b) inserting said cleaning head through the upper cavity of the carcass and into the lower cavity of the carcass;

(c) spraying the upper and lower cavities of the carcass with cleaning fluid by directing the cleaning fluid onto the diffusion surfaces to diffuse the spray of cleaning fluid while the cleaning head is inserted into the carcass;

(d) maintaining the cleaning head at a fixed position for a dwell period while the cleaning head is extended into the lower cavity;

(e) retracting the cleaning head from the carcass; and (f) conveying the carcass away from the sprayer assembly.

18. A method for cleaning a poultry carcass having an upper and a lower internal cavity comprising the steps of:

(a) conveying a poultry carcass into engagement with a sprayer assembly having a cleaning head;

(b) inserting said cleaning head through the upper cavity of the carcass and into the lower cavity of the carcass;

(c) spraying the upper and lower cavities of the carcass with cleaning fluid while the cleaning head is inserted into the carcass;

(d) maintaining the cleaning head at a fixed position for a dwell period while the cleaning head is extended into the lower cavity, wherein the dwell period is sufficiently long to allow most of the cleaning fluid sprayed into the upper cavity to drain from the carcass;

(e) retracting the cleaning head from the carcass; and (f) conveying the carcass away from the sprayer assembly.

19. A method for cleaning a poultry carcass having an upper and a lower internal cavity, comprising the steps of:

(a) conveying a poultry carcass into engagement with a sprayer assembly having a cleaning head;

(b) inserting said cleaning head through the upper cavity of the carcass and into the lower cavity of the carcass;

(c) spraying the upper and lower cavities of the carcass with cleaning fluid while the cleaning head is inserted into the carcass;

(d) maintaining the cleaning head at a fixed position for a dwell period while the cleaning head is extended into the lower cavity;

(e) interrupting the spray of cleaning fluid during the dwell period so that there is an absence of spray during the interruption of spray;

(f) retracting the cleaning head from the carcass; and (f) conveying the carcass away from the sprayer assembly.

20. The method of claim 19 wherein the spray of cleaning fluid is interrupted for substantially all of the dwell period.

* * * * *